Dec. 19, 1967 W. MICLO 3,358,663
TWO-CYCLE INTERNAL COMBUSTION ENGINE
Filed May 18, 1967 3 Sheets-Sheet 1

INVENTOR.
WALTER MICLO
BY
Kenneth E. Merklen
ATTORNEY

United States Patent Office 3,358,663
Patented Dec. 19, 1967

3,358,663
TWO-CYCLE INTERNAL COMBUSTION ENGINE
Walter Miclo, 2061 St. Raymond Ave.,
Bronx, N.Y. 10462
Filed May 18, 1967, Ser. No. 639,460
6 Claims. (Cl. 123—139)

ABSTRACT OF THE DISCLOSURE

The present invention relates to two-cycle internal combustion engines which employ the diesel cycle. The engine is characterized by a low compression ratio of the fuel or volatile matter in the firing chamber, atomized fuel injection coordinated with and actuated by the opposing piston during its power stroke, timed loading of the firing chamber for controlled ignition which is a function of the cyclic position of an opposing piston and the internal heat of the fuel-loaded cylinder. Thus the engine here disclosed operates efficiently on low octane fuel without danger of pre-ignition and makes greater and more efficient use of the power stroke of the pistons of the engine.

---

This is a continuation-in-part of application Ser. No. 486,755, filed on Sept. 13, 1965 under the title, "Two-Cycle Internal Combustion Engines," and now abandoned.

The present invention relates to two-cycle internal combustion engines employing the diesel cycle. In particular the present invention relates to multicylinder, two stroke cycle internal combustion engines which employ liquid fuel injection utilizing an impact force, which is a byproduct of the power stroke of the reciprocating pistons to actuate such injection and to simultaneously atomize the fuel during injection into the firing chamber.

Heretofore, methods of fuel injection used in internal combustion engines have overlooked utilization of the impact force potential generated during the power stroke of reciprocating pistons to inject fuel into the firing chamber of the cylinder. In some internal combustion engines the latter portion of the power stroke has virtually become unused because of the overriding power thrust of the piston in the next fired cylinder.

I have found that, in a multicylinder, two stroke cycle internal combustion engine impact force of a recirprocating piston during a portion of the power stroke of such piston may be employed to actuate injection of fuel into the firing chamber of an opposing cylinder and to simultaneously atomize the injected fuel, during injection so as to render such fuel in suspension in the firing chamber, ready for ignition.

The apparatus and principle that I herein disclose provides a multicylinder two-cycle internal combustion engine using self actuated injection means for injecting atomized liquid hydrocarbon into a firing chamber. This may be accomplished in timed relation to the cyclic position of the reciprocating piston so as to eliminate pre-ignition regardless of the octane rating of the fuel employed.

In addition, both a carburetor and distributor rotor are eliminated. Because of the novel method and apparatus used for loading fuel into the firing chamber the need for a carburetor is made unnecessary. Timed entry of the injected atomized fuel eliminates preignition and permits ignition of the fuel by engine heat.

It is an object of the present invention to provide a two stroke cycle internal combustion engine in which a portion of the power stroke of a reciprocating piston is employed for actuating fuel injection into the firing chamber of the opposing cylinder.

Another object is to provide a two stroke cycle internal combustion engine which operates with fuel injection, has relatively little compression ratio and ignites fuel in the firing chamber of a cylinder by the internal heat of the cylinder to be fired.

A further object is to provide a two stroke internal combustion engine which utilizes the impact force of the reciprocation piston to inject fuel into the firing chamber of an opposing cylinder thus eliminating the need for a fuel carburetor.

A still further object is to provide a two stroke internal combustion engine which employs piston actuated fuel injection and eliminates the need for a carburetor and distributor-rotor.

A still further object is to provide a two stroke internal combustion engine employing piston actuated fuel injection in which a fuel metering valve and a fuel injection chamber share a common wall and the metering valve isolates the fuel injection chamber.

These and other objects will become apparent from reading the following detailed description with reference to the accompanying drawings in which.

Generally, the invention embraces internal combustion engines employing liquid hydrocarbon, such as regular grade gasoline, for example, for fuel. The liquid fuel is mixed with air in the firing chamber of a cylinder which fuel is there ignited. The engine consists of conventional pistons, in multiples of two, connected with a mounted crankshaft, the pistons are fitted in conventional cylinders which have exhaust ports which are exposed at least when the pistons are at the bottom dead center (BDC) of a 360° cycle of a crankshaft. Each firing chamber, which is formed by the piston head, cylinder head and part of the cylinder wall includes a fuel intake nozzle above the top dead center position of the piston and overhead air ventilation valves. Injection of fuel is effected by a plunger movable in a fuel injection chamber, the injection chamber formed by a cavity in which the plunger forms a part, with a fuel intake downstream from the fuel supply and a checked output, part of which is the intake nozzle of the associated firing chamber. During injection of the fuel into the firing chamber the fuel is atomized. The other end of the plunger is coupled to a push rod which is connected to a rocker arm which pivots on a rocker shaft. The rocker arm at its opposite end extends into the path of the piston which is 180° out of phase with the piston associated with the firing chamber serviced by such injection apparatus. Associated with the fuel injection chamber is a ported metering valve which isolates the chamber while the fuel is being pressurized. The metering valve is actuated by a rocker arm similar to that described above and is positioned to be actuated by the same piston but prior to actuation of the rocker arm linked to the plunger of the fuel injection chamber such that the metering valve first isolates or seals the fuel injection chamber input before the fuel in the full chamber is forced into the firing chamber of the associated cylinder.

Figure 1:
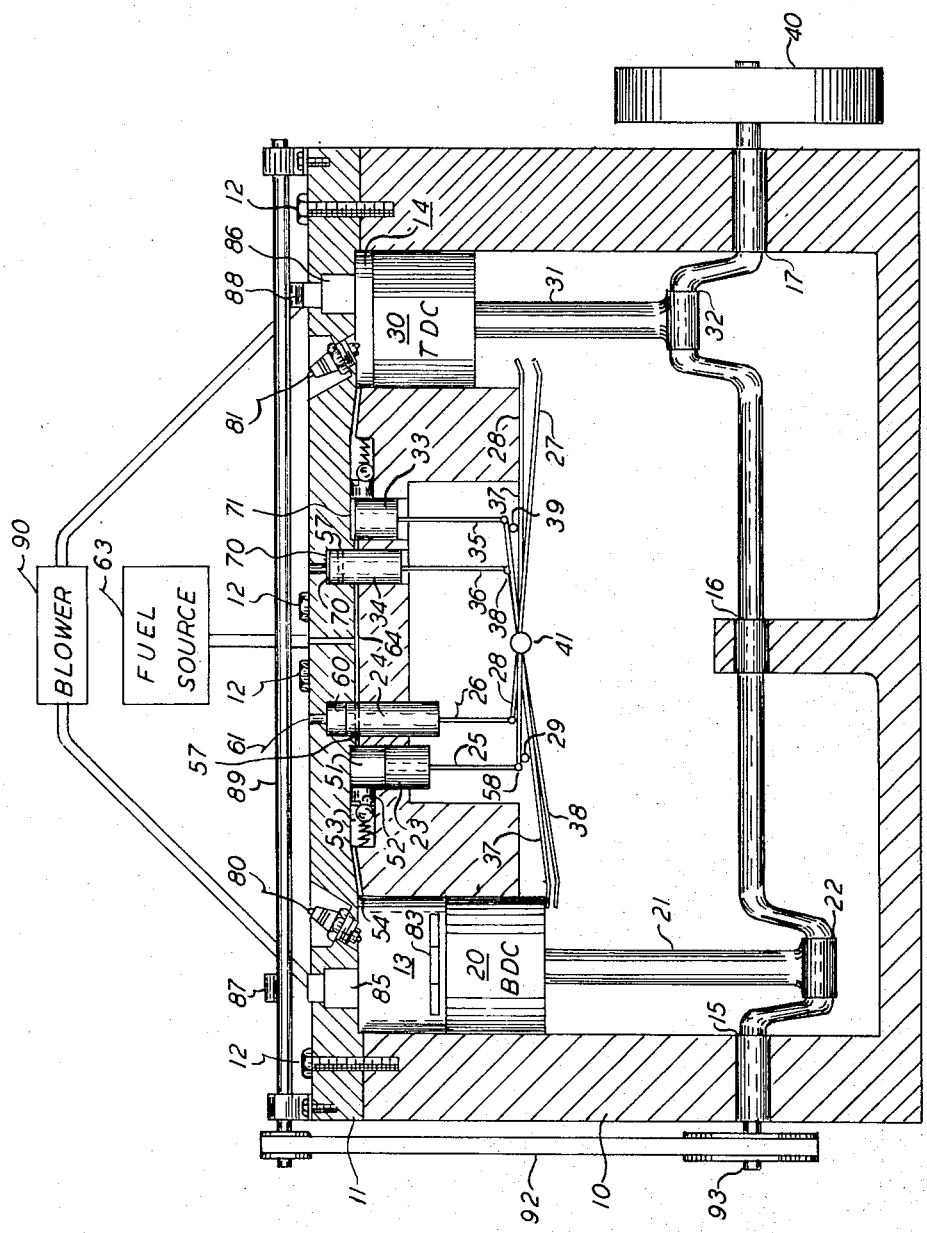
FIG. 1 is a sectional view of the preferred embodiment of the present invention.

Referring to FIG. 1 an engine block 10 is illustrated in sectional view to which is bolted a head 11 by bolts 12. It will be appreciated that the refined details, such as gaskets and/or seals and/or cooling apparatus have been omitted to make the drawing clear. To simplify the drawing a two cylinder engine is illustrated although an engine employing the principles of the present invention may have any number of cylinders, in multiples of two.

Essentially, cylinders having pistons cycling 180° out-of-phase with each other would be related to each other as the relation between such cylinders (and pistons) is described herein. These are referred to as opposing pistons or opposing cylinders.

Preferable, the block is made of any material, preferably metal that will retain substantially high heat (in excess of 464° F.) without deforming. Steel is one such metal although other materials may be used if desired. The block 10 includes a left cylinder 13 and a right cylinder 14 in parallel relation. The block 10 has provision for mounting a crankshaft in bearings 15, 16, and 17, the bearings 15, 16 and 17 normally referred to as main bearings. A piston 20 rides in cylinder 13 and is connected via connecting rod 21 to the crankshaft at 22 by a conventional connecting rod bearing. The piston 20 is connected to the connecting rod by the usual wrist pin and bearing arrangement.

Piston 30 is coupled to the crankshaft via connecting rod 31 at 32, the two pistons being offset from each other 180°. The bearings, connecting rods, crankshaft and undersections of the pistons are exposed to oil (not illustrated) in a crankcase (not shown). Piston 30 is illustrated at top dead center (TDC) and piston 20 is illustrated at bottom dead center (BDC). A fly wheel 40 is illustrated as connected to the crankshaft on the outer side of the block 10, on the bearing 17.

Between the cylinders is a pivot or fulcrum means such as a shaft 41 extending the width of the block and secured to the block to provide a pivot bar or shaft. Pivotally coupled to shaft 41 are the rocker arms which convert and transmit impact force into a pushing or driving force used for actuating the plungers 23 and 24 associated with cylinder 13, and 33 and 34 associated with cylinder 14.

Plungers 23 and 33 are the plungers of the fuel injection chambers for the respective cylinders 13 and 14. The plungers 24 and 34 are plungers for the metering valves associated with the respective fuel injection chambers 23/51 and 33/71.

The plunger 23 is mounted in the fuel injection chamber 51, the plunger forming the one extremity of the chamber. The chamber 51 includes an outlet 52 and check valve means 53 represented as a ball check valve and on the far side of the check valve is the channel of the intake nozzle 54 opening into the cylinder 13. The check valve 53 is preferably very light and is used for preventing blow back during ignition in the firing chamber of cylinder 13 thus isolating the injection chamber from the firing chamber. The intake nozzle 54 is preferably very small in diameter, for example $\frac{1}{40}$ of an inch in diameter, such that fuel forced through such nozzle by action of a substantially greater diameter plunger is under great pressure and is atomized, upon injection into the firing chamber. The volume of the cavity of the fuel injection chamber should be kept minimal to reduce shock on the linkage.

A push or drive rod 25 is coupled to the plunger 23 and to a rocker arm 27. The drive rod 25 and rocker arm 27 are coupled at coupling 58. Rocker arm 27 is pivotally journaled to shaft 41 with rocker arm 27 extending into the path of the opposing piston 30. It will be understood that rocker arm 27 pivots on the shaft 41, the shaft serving as a fulcrum. As such when the arm 27 pivots the extremes of the arm 27 will travel in an arc thus the coupling or linkage at 58 is preferably of loose construction such as two oblong eyes, for example, or any other linkage which will couple the rods and permit arcuate movement of end of rocker arm 27.

The other extremity of rocker arm 27 (away from linkage 58) extends to a position under the skirt of the piston 30. When the rod 25 is in its low position at 58 (i.e. plunger 23 down in the chamber 51) the left end (near 58) of rod 27 rests on stop 29. Stop 29 (and 39) is preferably adjustable so that the position of the plunger 23 in the fuel injection chamber 51 may be adjustable thus according a means of adjustably controlling the amount of liquid fuel containable in the fuel injection chamber 51. The stop 39 is an adjustment for positioning rod 35 and thus position of plunger 33 in the fuel injection chamber associated with the fuel injection apparatus for the firing chamber of cylinder 14 and piston 30.

As illustrated, the components of the fuel injection apparatus including the fuel injection chamber, the plungers, the meter valve and linkages are essentially in mirror image construction.

The plunger 33 includes a linkage arrangement with a drive rod or shaft 35, a loose linkage, coupling the rod 35 to arm 37, and the rocker arm 37 which pivots on the shaft 41, the arm 37 extending to a point under the skirt of piston 20.

It should be pointed out that the arms or rods 27, 28, 37 and 38 and the arms or rods 25, 26, 35 and 36 are preferably of steel construction and the pistons 20 and 30, particularly the skirt or section which comes in contact with the arms 27, 28, 37 and 38 are of metal construction which will withstand the shock from the impact which occurs between the piston and the arm or rod extremities. It should also be pointed out that the extremities so struck by a portion of the piston near the end of its power stroke will be coated with oil.

The linkage formed by the drive or push rod or shaft 26 coupled to the rocker arm 28, which rocker arm pivots about the shaft 41 is the structure and linkage which transmits power for positioning the plunger 24 of the metering valve. It will be noticed that the metering valve is a ported valve which includes a ported plunger 24 in a chamber 60 which has a head space. The head space has an aperture 61 which permits the metering valve chamber to breathe. The plunger 24 includes an aperture or port 57 which, when plunger 24 is in its down position, aligns with the fuel line 64 and the input to fuel injection chamber 51.

The block 63 represents a fuel source and supply which may be under pressure. A fuel line 64 junctions into separate feeding lines into the ported metering valves 24 and 34. When the ported plunger of the metering valve is driven into the head space such as seen on the right hand ported metering valve 34, the port 67 in the plunger 34 is out of line with the fuel line 64 and the intake for the fuel injection chamber 71 thus cutting off the fuel supply and isolating the fuel injection chamber 71. When the ported plunger of the metering valve is withdrawn from the head space such as seen on the left hand ported metering valve 24, the port 57 in the plunger 24 is in alignment with the fuel line 64 and the intake for the fuel injection chamber 51. In this condition the fuel injection chamber is open. This is more clearly shown in FIG. 2.

It will be seen that the position of the meter valve plunger is dependent upon the position of the piston in the opposing cylinder.

Figure 2:
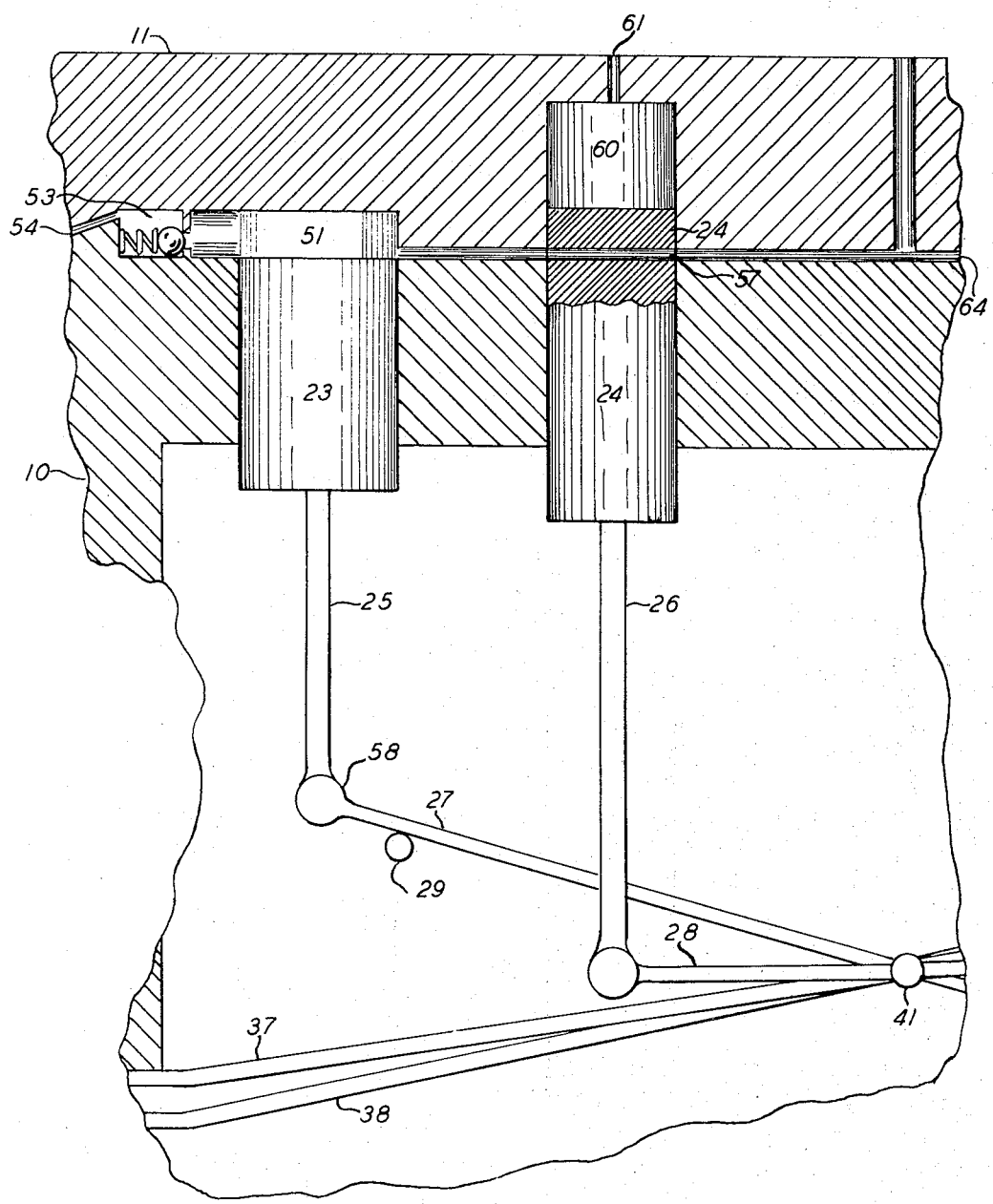
FIG. 2 is an enlarged detail sectional drawing showing the fuel injection chamber and fuel metering valve linkage and structure.

With respect to the fuel injection chamber, when the plunger is down, such as 23, the chamber above the plunger 51 is filled or loaded with liquid fuel. Coordination between the position of the plunger 24 of the metering valve and the position of the plunger 23 of the fuel injection chamber provides a suction effect to effectively fill the cavity of the chamber 51. In this respect the breathing vane 61 at the head of the head space 60 is preferably kept open and is relatively small. The amount of pressure under which the fuel is fed through the metering valve also aids in filling the cavity of chamber 51. The upper portion of the plunger 24, above port 57 as seen in FIG. 2, prevents leakage of the fuel through the breathing vane 61.

Operationally the extremity of the rocker arm 28 (38) under the actuating piston is normally positioned physically above the extremity of arm 27 (37) at the same point. This condition is maintained by stop 29 (39), which stops arm 27 (37) while rod 28 (38) is stopped by the wall of the block 10. When the actuating piston 30 is positioned above the extremities of arm 28 and 27 the ported metering valve is open and the fuel injection chamber is either filled or being filled with fuel. The spring of the check valve 53 is sufficiently strong to hold fuel in the chamber 51 when under normal pressure thus preventing fuel leakage into the intake nozzle duct 54.

When the actuating piston descends the rocker arm 28 (of the metering valve) is first contacted and through the linkage structure the plunger 24 is driven into the head space 60 driving the port 57 out of alignment with the fuel line 64 and the intake to the chamber 51 cutting off the fuel supply and isolating the fuel injection chamber 51. After the fuel line is interrupted the rocker arm 27 is struck by the still descending piston and through the linkage structure the plunger 23 is driven into the chamber 51. Great pressure is applied to the fuel in chamber 51 and the fuel is driven under such pressure through the check valve 53 and through the duct of the nozzle 54. The relatively large difference in diameter between the intake duct 54 and the chamber 51 creates a tremendous pressure on the fuel (the intake duct being, for example, substantially 1/40 of an inch and the chamber 51 being for example approximately 1/2 to 3/8 of an inch in diameter) which is forced into the firing chamber of cylinder 13 (the opposing cylinder of the actuating cylinder) in a very fine spray essentially rendering a fuel suspension in the firing chamber.

The timing of the fuel injection is such that the piston 20 is approaching its top dead center (TDC) position and ready to fire. Thus precisely timed injection of atomized fuel has been accomplished in one firing chamber by utilizing the down or power stroke of the opposing piston. Premature ignition will not occur because fuel is only injected into the firing chamber at the precise moment or instant when ignition is desired. In this respect electric power may be supplied to the spark plugs 80 and 81 at all times thereby eliminating the need for a distributor and rotor.

When the temperature of the firing chamber is raised sufficiently high (i.e. in excess of 464° F. for gasoline) the atomized hydrocarbon fuel will ignite without the presence of a spark from the spark plug and the engine will run on a diesel cycle. It should here be pointed out that ignition is not a function of compression by the upwardly traveling piston.

In order to evacuate the burned gases after ignition the piston is driven down in its power stroke and as the piston approaches its bottom dead center (BDC) an exhaust port or valve 83 (84) is opened or exposed. To aid in ventilating the cylinder when the exhaust port is still exposed a gate valve 85 in the head of the cylinder may be opened and fresh air may be forced or blown into the cylinder 13. Apparatus providing forced air is represented by the block 90 labeled blower which presents air under pressure to the gate valves 85 and 86 of the respective cylinders 13 and 14 through tubes or hosing there represented. In order to open the gate valve at the precise time when the exhaust port is exposed a cam arrangement such as cam lobe 87 on shaft 89 which opens gate valve 85 and cam lobe 88 on shaft 89 which opens gate valve 86 is employed. The gate valves 85 and 86 are preferably spring loaded so that the valve closes automatically sealing the firing chamber at the head point upon release by the actuating cam. The shaft 89 may be mounted on the head 11 in conventional manner and rotated in its mounting by a timing belt such as 92, driven by a gear 93 coupled to the crankshaft at the outer side of bearing 15.

The position of the cam lobe 87 may be adjusted so as to hold the gate valve 85 open during part of the up stroke of the piston 20. This assures complete ventilation of the cylinder 13 and fresh air for the next ignition.

The gate valve 85 is preferably closed as explained below, after closure of the exhaust port but before injection of the fuel. The timing of the gate valve opening and closing may be such as to assure a sufficient amount of fresh air for the amount of fuel injected so that complete burning of the fuel is achieved during ignition. The cam lobe 88 may be similarly adjusted so as to operate spring loaded gate valve 86 in similar fashion.

Describing the operation of the engine, it will be understood that the engine may have accessory parts such as a starter motor, of the conventional type and a battery which may supply electrical requirements. The accessory parts have been omitted for simplification.

During engine operation the chemical reaction of the burning of hydrocarbon fuel, gasoline, for example, may be referred to as exothermic reaction. This means that more heat is liberated from the burning process than is required to initiate the process. When the engine is initially started (it is here assumed that the engine is cold) the burning of fuel will, for a number of cycles be accomplished by use of an electric spark developed by the spark plug extending into the firing chamber. When the temperature of the cylinder walls has been raised sufficiently past the temperature of spontaneous ignition of the fuel used (for gasoline approximately 464° F.) the electrical spark may be eliminated. In order to compensate for the cooling effect of lubrication and cooling systems and other causes which would tend to lower the internal cylinder temperature, the temperature of the cylinders should be maintained well above the temperature of spontaneous ignition for continued engine operation. This may be accomplished by thermostatic regulation of the cooling system. Ignition will occur without an electric spark after the temperature of the cylinder rises somewhat above the spontaneous ignition temperature. Ignition of the fuel takes place because the hot surface is capable of igniting a combustible spray of fuel ("Chemical Engineers' Handbook" by Perry, pp. 9–30) and the propagation of combustion is very rapid. Ignition of the fuel will not occur prematurely because the fuel is not injected into the firing chamber until the cylinder is ready to be fired (the piston is just approaching TDC).

Describing the operation of the engine in particular, a starter shaft (not shown), from a starter mechanism (not shown), which may be manual or electric, is activated and turns the crankshaft. Let it be assumed that the left piston 20 is halfway between its TDC point and BDC point on a descending phase and the right piston 30 is between its TDC point and BDC point on an ascending phase.

The stops 29 and 39 which are adjustable were adjusted during previous cut-off of the engine to position the plunger of the fuel injection chamber far enough into the cylinder to cut off the fuel injection operation.

Prior to actuating the starter motor the stops 29 and 39 are repositioned so as to lower the plungers 23 and 33 thereby exposing a cavity in the fuel injection chamber of the respective plungers.

As the piston 20 approaches BDC the rocker arm 38 is struck and the plunger 34 is driven into the chamber of the metering valve thus isolating the fuel injection chamber 33/71. Assuming the chamber 71 is loaded with fuel, the piston then strikes the rocker arm 37 which effectively causes the plunger 33 to be driven into the fuel injection chamber thereby forcing the fuel through the check valve, into the atomizing duct and into the firing chamber of the cylinder 14. As the piston 20 approached its BDC the piston 30 approaches its TDC which is its point in the cycle at which ignition takes place. At such point the fuel is effectively injectively atomized into the firing chamber.

If the engine temperature is below the fuel ignition temperature the spark plug 81 is being constantly fired and since fuel is supplied only at the time for firing, ignition occurs at the desired point in the cycle.

When the piston 20 approaches BDC the exhaust port 83 is exposed and the left cylinder is ventilated. Prior to closure of the exhaust port 83 the gate valve 85 at the head of cylinder 13 is opened by action of rotation of the cam lobe 87 on shaft 89. This gate valve will be released and close (it is spring loaded) sometime after the closure of the exhaust port 83 during ascent of piston 20 but before the piston 20 approaches its firing position. Preferably the gate valve is released so as to close before the 270° point in the piston cycle so that the cylinder wall will not be cooled excessively.

The piston 30 is driven down (power stroke) in its cylinder by the expanding gases, thus rotating the crankshaft and moving the piston 20 up. As piston 20 ascends the rocker arms 37 and 38 are essentially released and the plungers 33 and 34 descend in their respective chambers. If the descent of the plungers in the fuel injection chamber and the metering valve is not sufficiently rapid, as compared with the travel of the piston, the plungers may be spring loaded to return the plungers to their then most open position with respect to their respective chamber. The rocker arm 37 is stopped by stop 39 thus positioning the plunger 33 in its most open position but the plunger 34 is still sufficiently high in its chamber to keep the fuel injection chamber isolated. As the piston 20 continues to rise the rocker arm 38 is fully released and is stopped by the internal portion of the engine block. The plunger 34 will now be in position so that the port 67 aligns with the fuel line 64 and the intake of the cavity of the fuel injection chamber thus the chamber 71 is filled or loaded with fuel.

The piston 20 continues to rise and the rotating crankshaft rotates gear 93 which draws the timing chain 92 for rotating the cam shaft 89 and cam lobes 87 and 88 for positioning the respective gate valves 85 and 86. The gate valve 85 is released and closes before piston 20 approaches its TDC position.

As piston 20 approaches its TDC position the opposing piston 30 approaches its BDC position. On descending the exhaust port 84 is exposed and the expanding gases in the cylinder 14 are evacuated.

Preferably the descending piston impacts with the rocker arm 28 after exposure of the exhaust port. This timing effectively reduces the impact force but such impact force is more than sufficient to perform the function of chamber isolation and fuel atomized injection.

The skirt of the descending piston 30 strikes the rocker arm 28 which effectively drives the plunger 24 into the chamber of the metering valve isolating the fuel injection chamber 51. After isolation and fuel cut-off is effected the piston skirt makes impact with rocker arm 27 which effectively drives the plunger 23 into the cavity 51 of the fuel injection chamber thus driving the fuel through the check valve 53, into the atomizing duct 54 and into the firing chamber of the cylinder 13 just as piston 20 reaches the ignition point in its cycle.

The cycle of each piston and its associated components is identical with respect to the phases of ignition, power and exhaust.

When the cylinder temperature is sufficiently high to support ignition of the atomized fuel, the spark generated by the spark plug may be discontinued and the stops 29 and 39 may be adjusted so as to permit enlargement of the cavity of the respective fuel injection chambers.

FIG. 2 is a more detailed view of the fuel injection chamber, the fuel metering valve and the linkage for controlling these components by piston impact.

The fuel source may be of the conventional type of fuel tank and may include a fuel pump for providing fuel under pressure. The fuel pressure, however would be insufficient to overcome the check valve.

Figure 3:
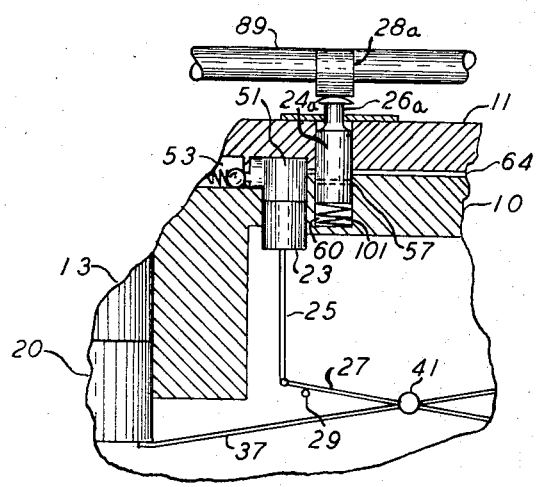
FIG. 3 is an alternate arrangement for fuel flow control.

FIG. 3 illustrates an alternate arrangement for the plunger of the ported metering valve in which the plunger 24a is inverted and resides in the head 11. The plunger 24a is driven by cam lobe 28a into the space 60 to align the port 57 with the fuel line 64 and cavity 51. A spring 101 is provided to lift the plunger 24a when the cam lobe perimeter diminishes thus maintaining finger 26a in contact with the cam lobe and position the port 57 out of alignment with the fuel line 64 and isolating the fuel injection chamber 51.

Figure 4:
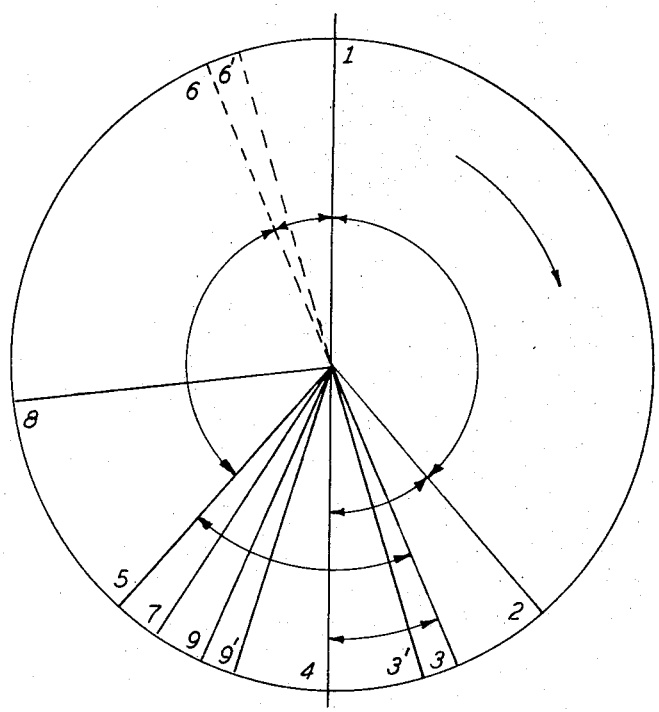
FIG. 4 is a cyclic chart helpful in understanding the invention.

Referring to FIG. 4 a diagram relating the functions of the various engine components to one revolution of the crankshaft is shown. The various crank angles are merely suggestive.

Starting at point 1, this represents piston TDC and going clockwise the piston is in its expansion or power stroke, in which the fuel is burning. It should be kept in mind that the opposing piston is 180° out of phase and when one piston is at TDC (position 1) the other is at BDC (position 4). When the piston is in its power stroke there are no significant openings in the cylinder. At point 2 the exhaust port starts to be exposed by the piston. Blow-down of the burned gases starts to occur.

At point 3 the piston's skirt strikes the rocker arm of the metering valve linkage and at 3' strikes the rocker arm of the fuel injection chamber linkage. These rocker arms are part of the linkage of the metering valve and the fuel injection chamber of the other cylinder (the piston 180° out of phase). At point 4 the piston is at BDC and begins its recovery stroke. As the piston ascends both rocker arms rise with the piston and at point 9' the rocker arm of the fuel injection chamber is fully released. At point 9 the rocker arm of the metering valve is fully released.

At some point before closure of the exhaust port which occurs at point 5, the gate valve is opened and total cylinder ventilation is effected. The point 7 may represent the point at which the gate valve is opened. The gate valve is closed at point 8 thereby sealing the firing chamber as the piston approaches its firing position.

When the one piston is at point 6 the opposing piston is at position 3 and the opposing piston strikes the rocker arm of the metering valve associated with the one piston effectively isolating the fuel injection chamber associated with the one piston. At point 6' fuel injection into the firing chamber of the one cylinder occurs.

An alternative cycle would be to essentially reverse the functions performed at points 2 and 3 (3') and points 9 (9') and 5 so that the rocker arms are struck at full force, that is prior to the exposure of the exhaust port. The points 3' and 6' are somewhat adjustable by the positioning of the rocker arm stops 29 and 39, which stops would be uniformly positioned.

Thus I have described my invention and have suggested an alternative control for a plunger. Other changes, modifications, substitutions and alternatives may be made, as will be familiar to those skilled in the art, without departing from the spirit of the invention as defined in the appended claims.

What is claimed is:

1. In a multicylinder two stroke cycle internal combustion engine, at least one pair of cylinders with each cylinder of said pair located in parallel relation to each other, pistons in said cylinders operating 180° out of phase with respect to each other, a crankshaft having oppositely located crank bearings, piston rods connecting said pistons with each of said crank bearings respectively, valve and port means in said cylinders for scavenging exhaust gases from said cylinders, and nozzle means for injecting a charge of fuel in suspension into said cylinders, the improvement comprising;

a source of fuel under substantially constant pressure,
means for metering a charge of fuel and for forcing the metered charge through said nozzle in timed relation with the reciprocation of said pistons,
passage means connecting said source with said metering means, said metering means including, a first chamber coupled to said passage means, a second chamber connected to said first chamber for extending said passage means, first means movably positioned in said first chamber for isolating said second chamber from said passage means in response to actuation of the opposing piston by piston contact with an independent linkage connection, means connecting said second chamber to said nozzle and second means movably positioned in said second chamber for forcing fuel through said connecting means and said nozzle in response to actuation of said opposing piston by piston contact with an independent linkage connection after said second chamber is effectively isolated by said first means in said first chamber.

2. In a multicylinder two stroke cycle internal combustion engine as in claim 1 and in which said metering means further includes;

a shaft positioned between said pair of cylinders, a first rocker arm journaled on said shaft having one end coupled to said first means and the other end positioned in the path of travel of the opposing piston so that said opposing piston strikes said other end of said first rocker arm prior to bottom dead center in the power stroke of said opposing piston for positioning said first means for isolating said second chamber, a second rocker arm journaled on said shaft having one end coupled to said second means and the other end positioned in the path of travel of the said opposing piston so that said opposing piston strikes said other end of said second rocker arm after said second chamber is isolated for forcing fuel through said connecting means and into one cylinder via the said nozzle as the piston in said one cylinder, which is 180° out of phase with the said opposing piston, approaches into firing position.

3. In a multicylinder two stroke cycle internal combustion engine as in claim 2 and in which said first means includes a port for extending said passage means to said second chamber and said first means is normally positioned with said port in alignment with said passage means and said second chamber and said first means is positioned with said port out of alignment with said passage means and said second chamber for isolating said second chamber.

4. In a multicylinder two stroke cycle internal combustion engine, a pair of cylinders located in parallel relation, pistons in said cylinders, a crankshaft having oppositely located crank bearings, piston rods connecting said pistons with each of said crank bearings respectively, valve and port means in said cylinders for scavenging exhaust gases from said cylinders, and nozzel means for injecting a charge of fuel in spray form into said cylinders, the improvement comprising;

means for metering a charge of fuel and for forcing the metered charge through said nozzles in timed relation with the reciprocation of said pistons including, a source of fuel under substantially constant pressure, passage means connecting said source with each of said nozzle means, pairs of chambers in said passage means between said source and each of said nozzle means, a pair of ported metering valves movably mounted one in each of said chambers in each pair, plungers mounted to reciprocate in the other of said chambers of each pair which chambers are located one with respect to another in a direction downstream of the fuel flow to the nozzles, a rocker shaft located between said cylinders, separate rocker arms journaled on said shaft each having a connection at one end to a metering valve and a plunger of one cylinder and having its opposite end projecting into the path of movement of the piston in the other of said cylinders to be moved downwardly in a sequential manner by the piston therein adjacent the end of the power stroke whereby each of said metering valves is alternately positioned in its chamber so that a predetermined charge of fuel flows through a port therein from said source to the chambers containing each plunger and then closes during reciprocation of said plungers which deliver the metered charge to said nozzle means.

5. In a multicylinder two stroke cycle internal combustion engine as in claim 4 and said passage means further includes one-way valve means positioned between said nozzle means and the said other of said chambers for isolating said other of said chambers during the power stroke of the associated piston.

6. In a multicylinder two stroke cycle internal combustion engine as in claim 4 and in which said metering means further includes;

adjustable means, individual to each of said plungers mounted to reciprocate in the other of said chambers, for positioning said plungers in the chambers for adjustably controlling the amount of fuel so metered.

References Cited

UNITED STATES PATENTS

| 1,106,940 | 8/1914 | Hadwiger | 123—73 |
| 1,237,312 | 8/1917 | Donning | 123—73 |
| 1,677,305 | 7/1928 | Sperry | 123—65 |
| 2,054,413 | 9/1936 | Fisher et al. | 123—27 |
| 2,362,700 | 11/1944 | Kirtland et al. | 123—65 |
| 2,984,230 | 5/1961 | Cummings | 123—140 |
| 3,036,565 | 5/1962 | Reiners | 123—139 |
| 3,308,794 | 3/1967 | Bailey | 123—139 |

LAURENCE M. GOODRIDGE, *Primary Examiner.*